United States Patent
Fujiwara et al.

(10) Patent No.: US 11,236,016 B2
(45) Date of Patent: Feb. 1, 2022

(54) CHEMICALLY STRENGTHENED GLASS

(71) Applicant: AGC INC., Chiyoda-ku (JP)

(72) Inventors: Yusuke Fujiwara, Tokyo (JP); Izuru Kashima, Tokyo (JP); Michinori Suehara, Tokyo (JP)

(73) Assignee: AGC INC., Chiyoda-ku (JP)

(*) Notice: Subject to any disclaimer, the term of this patent is extended or adjusted under 35 U.S.C. 154(b) by 273 days.

(21) Appl. No.: 16/660,982

(22) Filed: Oct. 23, 2019

(65) Prior Publication Data

US 2020/0055773 A1 Feb. 20, 2020

Related U.S. Application Data

(63) Continuation of application No. PCT/JP2018/016503, filed on Apr. 23, 2018.

(30) Foreign Application Priority Data

Apr. 26, 2017 (JP) .............................. JP2017-087404

(51) Int. Cl.
*B32B 15/04* (2006.01)
*C03C 21/00* (2006.01)
(Continued)

(52) U.S. Cl.
CPC ............ *C03C 21/002* (2013.01); *C03C 3/085* (2013.01); *C03C 3/097* (2013.01)

(58) Field of Classification Search
CPC .................................................... C03C 21/002
(Continued)

(56) References Cited

U.S. PATENT DOCUMENTS 9,840,437 B2 * 12/2017 Mauro ..................... C03C 3/093
10,150,698 B2 * 12/2018 Amin ..................... C03C 21/002
(Continued)

FOREIGN PATENT DOCUMENTS

| JP | 2015-166312 A | 9/2015 |
| JP | 2016-84282 A | 5/2016 |
| JP | 2016-142600 A | 8/2016 |

OTHER PUBLICATIONS

International Search Report dated Jul. 17, 2018 in PCT/JP2018/016503, filed on Apr. 23, 2018 (with English translation).
(Continued)

*Primary Examiner* — Lauren R Colgan
(74) *Attorney, Agent, or Firm* — Oblon, McClelland, Maier & Neustadt, L.L.P.

(57) ABSTRACT

The purpose of the present invention is to provide a chemically strengthened glass in which reduction in glass surface strength is effectively suppressed even without performing a polishing treatment after a prolonged chemical strengthening treatment has been conducted at a high temperature. The present invention relates to a chemically strengthened glass having a specific glass composition, wherein: the surface roughness (Ra) is a specific value or greater; the compressive stress layer depth of a surface layer is a specific value or greater; by setting the hydrogen concentration in the glass surface layer to be within a specific range, the surface strength of the glass is dramatically improved even without performing an etching treatment using hydrofluoric acid or polishing the glass surface after a prolonged chemical strengthening treatment has been conducted at a high temperature.

6 Claims, 4 Drawing Sheets

(51) Int. Cl.
*C03C 3/085* (2006.01)
*C03C 3/097* (2006.01)

(58) Field of Classification Search
USPC .................................................. 428/410, 426
See application file for complete search history.

(56) References Cited

U.S. PATENT DOCUMENTS

| | | | | |
|---|---|---|---|---|
| 11,079,309 | B2* | 8/2021 | Morey | .................... C03C 3/091 |
| 2012/0052271 | A1* | 3/2012 | Gomez | .................... C03C 3/095 |
| | | | | 428/213 |
| 2015/0030840 | A1 | 1/2015 | Gomez et al. | |
| 2016/0130178 | A1* | 5/2016 | Kashima | ................. C03C 3/091 |
| | | | | 428/141 |
| 2016/0130179 | A1 | 5/2016 | Kashima et al. | |
| 2016/0207828 | A1 | 7/2016 | Kashima et al. | |
| 2017/0283304 | A1* | 10/2017 | Yamazaki | ............. C03C 21/002 |
| 2017/0313621 | A1* | 11/2017 | Kashima | ............... C03C 21/002 |
| 2018/0072619 | A1 | 3/2018 | Kashima et al. | |
| 2018/0134610 | A1* | 5/2018 | Yamamoto | ............. C03C 3/087 |

OTHER PUBLICATIONS

Written Opinion dated Jul. 17, 2018 in PCT/JP2018/016503, filed on Apr. 23, 2018.
S. Ito et al., "Crack Blunting of High-Silica Glass", Journal of the American Ceramic Society, vol. 65, No. 8,(1982), pp. 368-371.
Won-Taek Han et al., "Effect of residual water in silica glass on static fatigue", Journal of Non-Crystalline Solids, 127, (1991) pp. 97-104.
S. Ilievski et al., "Practical IR extinction coefficients for water in commercial glasses determined by nuclear reaction analysis", Glastech. Ber. Glass Sci. Technol., 73 (2000) pp. 39-45.

\* cited by examiner

CHEMICALLY STRENGTHENED GLASS

TECHNICAL FIELD

The present invention relates to a chemically strengthened glass.

BACKGROUND ART

In a flat panel display device such as a digital camera, a cellular phone, or a portable information terminal PDA (Personal Digital Assistants), a thin sheet-like cover glass is disposed on a front surface of a display so as to occupy a wider area than an image display part thereof in order to protect the display and enhance the appearance thereof. Glass is high in theoretical strength. However, once the glass gets scratched, the strength of the glass is remarkably lowered. Accordingly, a chemically strengthened glass having a compressive stress layer formed in its glass surface by ion exchange or the like has been used as a cover glass requiring strength.

In accordance with a request to make the flat panel display device lighter and thinner, it is also requested to make the cover glass itself thinner. Accordingly, the cover glass is required to have higher strength in both of its surface and its end surface in order to satisfy the object.

In order to improve the surface strength of the chemically strengthened glass, it is required to increase the depth of the compressive stress layer. Conventionally, the depth of the compressive stress layer is increased by a chemical strengthening treatment performed at a low temperature and for a long time to thereby improve the surface strength (for example, Patent Literature 1).

In addition, it has been known that in the case where the hydrogen concentration profile in the surface layer of a chemically strengthened glass is adjusted within a specific range and a property of the glass surface is not lower than a specific value, the surface strength of the glass can be improved dramatically without polishing the glass surface or etching the glass surface with hydrofluoric acid after chemical strengthening (Patent Literature 2).

Furthermore, as for the strength of glass, it has been known that the strength of the glass is lowered by the existence of hydrogen (moisture) in the glass (Non-Patent Literatures 1 and 2).

CITATION LIST

Patent Literature

Patent Literature 1: JP-A-2016-084282
Patent Literature 2: JP-A-2015-166312

Non-Patent Literature

Non-Patent Literature 1: S. ITO et al., "Crack Blunting of High-Silica Glass", Journal of the American Ceramic Society, Vol. 65, No. 8, (1982), 368-371
Non-Patent Literature 2: Won-Taek Han et al., "Effect of residual water in silica glass on static fatigue", Journal of Non-Crystalline Solids, 127, (1991) 97-104

SUMMARY OF INVENTION

Technical Problem

According to the method described in Patent Literature 1, owing to the chemical strengthening treatment performed at a high temperature of 400° C. or more and for a short time, productivity can be improved, and the depth of the compressive stress layer can be increased. However, there is a problem that the surface strength is lowered. Although the surface strength is intended to be improved by polishing after the chemical strengthening treatment, there is a concern that the glass surface may get scratched by the polishing to thereby lower the strength. Furthermore, there is another concern that warpage of the glass may be increased by the polishing.

Furthermore, according to the glass described in Patent Literature 2, the hydrogen concentration profile in the surface layer of the chemically strengthened glass is adjusted within a specific range, and the surface roughness is not lower than a specific value. Thus, a glass sheet whose surface strength is improved can be provided. However, in the case where glass contains phosphorus, the phosphorus contained in the glass composition has a high affinity to water electrically. In addition, glass having a high phosphorus content has a poor water resistance so that the glass is easily eroded by water. Thus, the hydrogen concentration profile is affected by the phosphorus. Therefore, there is a problem that the surface strength is not sufficiently improved within the range of the hydrogen concentration profile disclosed in Patent Literature 2.

Therefore, an object of the present invention is to provide a chemically strengthened glass in which even when a glass having a glass composition containing phosphorus affecting the improvement of strength is chemically strengthened at a high temperature and for a long time, a sufficient depth can be secured in a compressive stress layer of a surface layer, so that a sufficient surface strength can be obtained and lowering of the surface strength of the glass can be effectively suppressed without polishing after the chemical strengthening.

Solution to Problem

As a result of earnest examinations, the present inventors have found that in a chemically strengthened glass having a specific glass composition containing phosphorus, a surface roughness (Ra) is set to be not less than a specific value, a depth of a compressive stress layer in a surface layer of the chemically strengthened glass is set to be not less than a specific value, and an average hydrogen concentration at a specific depth from the outermost surface of the chemically strengthened glass is set within a specific range, so that the surface strength of the glass can be improved dramatically and the reliability of the surface strength can be improved, without polishing the surface of the chemically strengthened glass or etching the surface of the chemically strengthened glass with hydrofluoric acid after chemical strengthening treatment performed at a high temperature and for a long time. Thus, the present inventors have completed the present invention.

That is, the present invention is configured as follows.
<1> A chemically strengthened glass including a compressive stress layer that is formed in a surface layer of the glass by an ion exchange method, in which:
the glass has a surface roughness (Ra) of 0.50 nm or more;
the glass has a depth of the compressive stress layer of 55 µm or more;
the glass has a composition including, in mole percentage on an oxide basis, 55.5 to 76.5% of $SiO_2$, 5 to 20% of $Al_2O_3$, 8 to 25% of $Na_2O$ and 0.1% or more of $P_2O_5$;

a hydrogen concentration Y1 in a region of a depth X from an outermost surface of the chemically strengthened glass satisfies Expression (I) below at X1=0.10 to 0.25 (μm);

a hydrogen concentration Y2 in a region of the depth X from the outermost surface of the chemically strengthened glass satisfies Expression (II) below at X2=0.25 to 0.4 (μm); and a surface strength F (N) measured on the conditions below by a ball-on-ring test satisfies a relation of $F \geq 1200 \times t^2$ with respect to a sheet thickness t (mm) of a sheet of the glass:

$$Y1 = a_1 X1 + b_1 \quad \text{(I),}$$

in which:
Y1 is the hydrogen concentration (mol/L, measured as $H_2O$);
X1 is the depth from the outermost surface of the glass (μm);
$a_1$ is −1.700 to −0.500; and
$b_1$ is 0.100 to 0.460, $$Y2 = a_2 X2 + b_2 \quad \text{(II),}$$

in which:
Y2 is the hydrogen concentration (mol/L, measured as $H_2O$);
X2 is the depth from the outermost surface of the glass (μm);
$a_2$ is −0.200 to −0.010; and
$b_2$ is 0.050 to 0.150, ball-on-ring test conditions:
A glass sheet having a sheet thickness t (mm) is disposed on a stainless steel ring having a diameter of 30 mm and including a contact portion rounded with a curvature radius of 2.5 mm, and a steel ball having a diameter of 10 mm is brought into contact with the glass sheet. In this state, the ball is loaded at a center of the ring under a static load conditions. A breaking load (in units of N) at which the glass is broken is regarded as a BOR strength, and an average value of 20 times measurements of the BOR strength is regarded as the surface strength F. Here, the case where a breaking start point of the glass is 2 mm or more away from a loading point of the ball is excluded from data for calculating the average value.

<2> The chemically strengthened glass according to the configuration <1>, having an average hydrogen concentration $c_1$ of 0.050 to 0.180 mol/L, in a region of the depth X1=0.10 to 0.25 μm from the outermost surface of the chemically strengthened glass, and having an average hydrogen concentration $c_2$ of 0.020 to 0.080 mol/L, in a region of the depth X2=0.25 to 0.4 μm.

<3> The chemically strengthened glass according to configuration <1> or <2>, having no polishing flaws in the surface thereof.

<4> The chemically strengthened glass according to any one of the configurations <1> through <3>, including 1% or more of an alkaline earth metal RO, in which RO designates MgO+CaO+SrO+BaO.

<5> The chemically strengthened glass according to any one of the configurations <1> through <4>, having a surface compressive stress of 100 MPa or more.

<6> The chemically strengthened glass according to any one of the configurations <1> through <5>, having an internal tensile stress of 72 MPa or less.

<7> The chemically strengthened glass according to any one of the configurations <1> through <6>, in which the depth of the compressive stress layer is 55 μm or more.

Advantageous Effects of Invention

According to the chemically strengthened glass having a specific glass composition according to the present invention, a depth of a compressive stress layer is made not less than a specific value, a surface roughness (Ra) is made not less than a specific value, and a hydrogen concentration profile in a surface layer of the glass is set within a specific range, so that it is possible to remarkably improve the surface strength of the glass and improve reliability of the surface strength, even after a chemical strengthening treatment performed at a high temperature and for a long time and without polishing the glass surface after the chemical strengthening.

DESCRIPTION OF EMBODIMENTS

Figure 1:
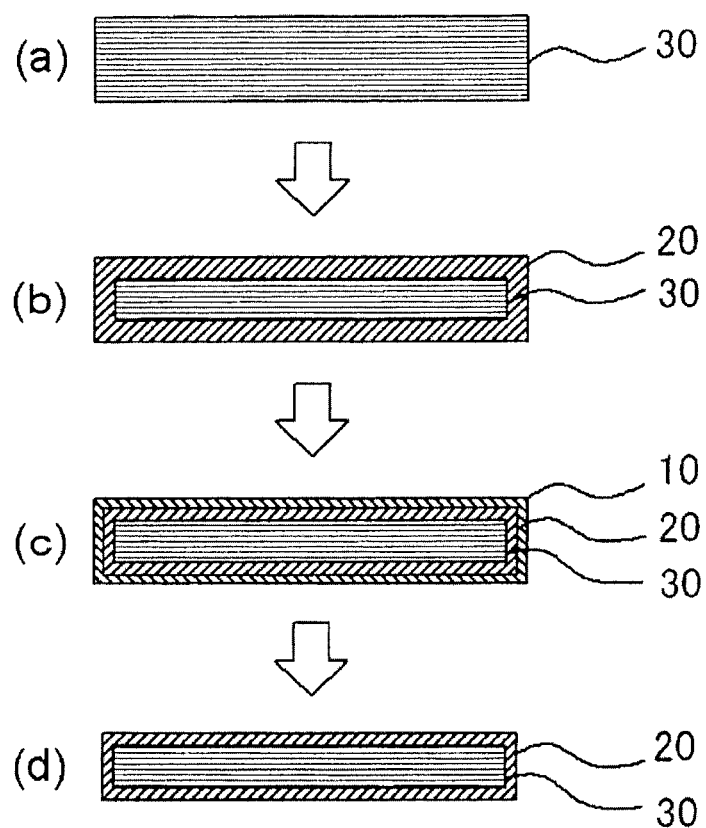
FIG. 1 is a schematic view illustrating a manufacturing process of a chemically strengthened glass according to the present invention.

The present invention will be described below in detail. However, the present invention is not limited to the following embodiments, and may be modified desirably to carry out the present invention without departing from the gist thereof.

Here, in the present description, "mass %" and "mass ppm" are synonyms for "weight %" and "weight ppm" respectively. In addition, simply written "ppm" means "weight ppm".

The word "to" designating a numerical range in the present description is used as a denotation of a range including numerical values before and after the word "to" as a lower limit value and an upper limit value of the range. As long as no specific stipulation is made, the word "to" in the present description will be used below in the same manner.

<Chemically Strengthened Glass>

A chemically strengthened glass including a compressive stress layer that is formed in a surface layer of the glass by an ion exchange method, in which:

the glass has a surface roughness (Ra) of 0.50 nm or more;

the glass has a depth of the compressive stress layer of 55 μm or more;

the glass has a composition including, in mole percentage on an oxide basis, 55.5 to 76.5% of $SiO_2$, 5 to 20% of $Al_2O_3$, 8 to 25% of $Na_2O$ and 0.1% or more of $P_2O_5$;

a hydrogen concentration Y1 in a region of a depth X from an outermost surface of the chemically strengthened glass satisfies Expression (I) below at X1=0.10 to 0.25 (μm);

a hydrogen concentration Y2 in a region of the depth X from the outermost surface of the chemically strengthened glass satisfies Expression (II) below at X2=0.25 to 0.4 (μm); and a surface strength F (N) measured on the conditions below by a ball-on-ring test satisfies a relation of F≥1200×t² with respect to a sheet thickness t (mm) of a sheet of the glass:

$$Y1 = a_1 X1 + b_1 \quad (I),$$

in which:
Y1 is the hydrogen concentration (mol/L, measured as $H_2O$);
X1 is the depth from the outermost surface of the glass (μm);
$a_1$ is −1.700 to −0.500; and
$b_1$ is 0.100 to 0.460, $$Y2 = a_2 X2 + b_2 \quad (II)$$

in which:
Y2 is the hydrogen concentration (mol/L, measured as $H_2O$);
X2 is the depth from the outermost surface of the glass (μm);
$a_2$ is −0.200 to −0.010; and
$b_2$ is 0.050 to 0.150,
ball-on-ring test conditions:

A glass sheet having a sheet thickness t (mm) is disposed on a stainless steel ring having a diameter of 30 mm and including a contact portion rounded with a curvature radius of 2.5 mm, and a steel ball having a diameter of 10 mm is brought into contact with the glass sheet. In this state, the ball is loaded at a center of the ring under a static load conditions. A breaking load (in units of N) at which the glass is broken is regarded as a BOR strength, and an average value of 20 times measurements of the BOR strength is regarded as the surface strength F. Here, the case where a breaking start point of the glass is 2 mm or more away from a loading point of the ball is excluded from data for calculating the average value.

In the chemically strengthened glass according to the present invention, an average hydrogen concentration $c_1$ in a region of a depth X1=0.10 to 0.25 μm from the outermost surface of the glass is preferably 0.050 to 0.180 mol/L, and an average hydrogen concentration $c_2$ in a region of a depth X2=0.25 to 0.4 μm is preferably 0.020 to 0.080 mol/L.

(Depth of Compressive Stress Layer)

The compressive stress layer is a high-density layer formed by ion exchange between Na ions in the glass surface and K ions in a molten salt when the glass as a raw material is brought into contact with an inorganic salt such as potassium nitrate.

The depth of the compressive stress layer (hereinafter also referred to as DOC) can be measured by use of an EPMA (Electron Probe Micro Analyzer), a surface stress meter (e.g. FSM-6000 made by ORIHARA Industrial Co., Ltd.), or the like.

In the chemically strengthened glass according to the present invention, the depth of the compressive stress layer (DOC) is 55 μm or more, preferably 60 μm or more, and more preferably 65 μm or more, in order to impart sufficient strength to the glass. On the other hand, the upper limit of the DOC is not particularly limited, but is typically 140 μm or less.

A thickness of a low-density layer to be removed by an acid treatment step or an alkali treatment step which will be described later is from about 10 nm to about 1,000 nm at the most as in Examples. Accordingly, as for the depth of the compressive stress layer (DOC) in the chemically strengthened glass according to the present invention, the depth of the compressive stress layer (DOC) formed in the chemical strengthening step is substantially equal to the depth of the compressive stress layer (DOC) after conducting the acid treatment step or the alkali treatment step.

(Surface Roughness)

In the chemically strengthened glass according to the present invention, a surface roughness (Ra) in a 1 μm×0.5 μm measurement region measured by AFM surface observation is 0.50 nm or more. The surface roughness (Ra) is preferably 0.55 nm or more, and more preferably 0.60 nm or more. On the other hand, the surface roughness is preferably 1.50 nm or less, more preferably 1.40 nm or less, and even more preferably 1.30 nm or less.

In the case where the surface roughness is not less than the aforementioned lower limit, the chemical strengthened glass can be made to have a high surface strength. In the case where the glass surface has a certain surface roughness, it is expected that stress concentration is suppressed to increase the strength. Incidentally, the surface roughness of a conventional not-polished chemically strengthened glass sheet is typically 0.15 nm or more and less than 0.20 nm.

(Hydrogen Concentration)

As for strength of glass, it has been known that the strength of the glass is lowered by the existence of hydrogen (moisture) in the glass. The present inventors have found that there is a case that strength of glass is lowered after a chemical strengthening treatment, and the major factor thereof is a generation of a chemical defect caused by moisture in an atmosphere intruding into the glass. It has also been found that this phenomenon is not limited in chemical strengthening, but may occur through a temperature increase step in a manufacturing step of glass.

In the case where the hydrogen concentration is high in glass, the hydrogen enters an Si—O—Si bond network in the glass to form Si—OH bond. Thus, the Si—O—Si bond is disconnected. As the hydrogen concentration in the glass is higher, it can be considered that parts where the Si—O—Si bond is disconnected are increased, and thus chemical defects tend to be generated to lower the strength.

The aforementioned Expression (I) is set in the region of the depth X1=0.10 to 0.25 μm from the outermost surface. The thickness of the compressive stress layer formed by an ion exchange depends on the degree of the chemical strengthening, but is formed within a range of from 55 to 140 μm. The intrusion depth of hydrogen into the glass depends on a diffusion coefficient, temperature and time, and the intrusion amount of hydrogen depends on the moisture amount in the atmosphere in addition to those factors. The hydrogen concentration after the chemical strengthening is the highest in the outermost surface and decreases gradually toward a deeper portion (bulk) where the compressive stress layer is not formed. The decreasing ratio of the hydrogen concentration is prescribed in Expression (I). In the outermost surface (X1=0 μm), the moisture concentration is likely to vary due to alteration with time. Therefore, Expression (I) is set in a region of a near-surface (X1=0.10 to 0.25 μm) which is assumed not to be affected by the variation of the moisture concentration in the outermost surface. The chemically strengthened glass according to the present invention has a composition containing phosphorus, and is therefore characterized in the hydrogen concentration in the near-surface.

In Expression (I), $a_1$ designates an inclination prescribing the decreasing ratio of the hydrogen concentration. The range of $a_1$ is −1.700 to −0.500, preferably −1.650 to −0.500, and more preferably −0.800 to −0.500.

In Expression (I), $b_1$ corresponds to the hydrogen concentration at the outermost surface (X1=0 μm). The range of $b_1$ is 0.100 to 0.460, preferably 0.140 to 0.460, and more preferably 0.140 to 0.450.

Furthermore, the chemically strengthened glass according to the present invention satisfies the aforementioned Expression (II). Expression (II) is set in the region of the depth X2=0.25 to 0.4 μm from the outermost surface. Expression (II) prescribes the decreasing ratio of the hydrogen concentration in a deeper range in the sheet thickness direction than the region X1 defining the near-surface.

In Expression (II), $a_2$ designates an inclination prescribing the decreasing ratio of the hydrogen concentration. The range of $a_2$ is −0.200 to −0.010, preferably −0.150 to −0.010, and more preferably −0.130 to −0.050.

In Expression (11), the range of $b_2$ is 0.050 to 0.150, preferably 0.045 to 0.145, and more preferably 0.040 to 0.140.

Generally it is considered that when a very small crack existing in a surface of glass is extended by an external mechanical pressure, reduction in strength of the glass is caused. According to Non-Patent Literature 2, it is considered that as the glass structure at a tip of a crack is richer in Si—OH, the crack is extended more easily. On the assumption that the tip of the crack is exposed to the atmosphere, it is estimated that the Si—OH content at the tip of the crack indicates a positive correlation with the hydrogen concentration in the outermost surface of the glass. Accordingly, it is preferable that $b_1$ and $b_2$ corresponding to the hydrogen concentration in the outermost surface are approximately within the aforementioned ranges.

Figure 3A:
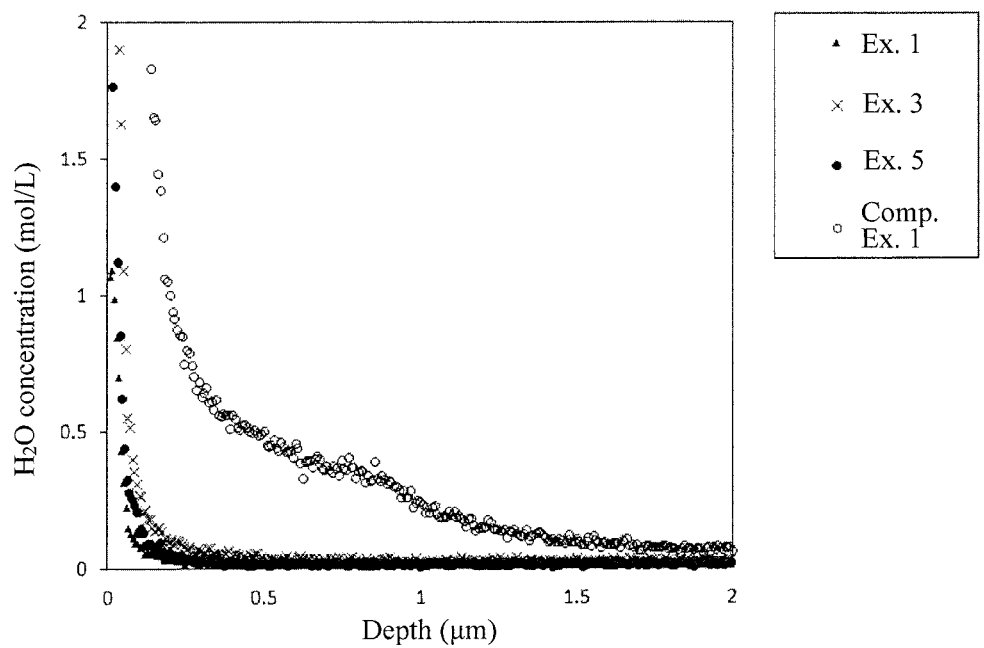
FIG. 3A shows hydrogen concentration profiles of chemically strengthened glasses obtained in Example 1, Example 3, Example 5 and Comparative Example 1.
Figure 3B:
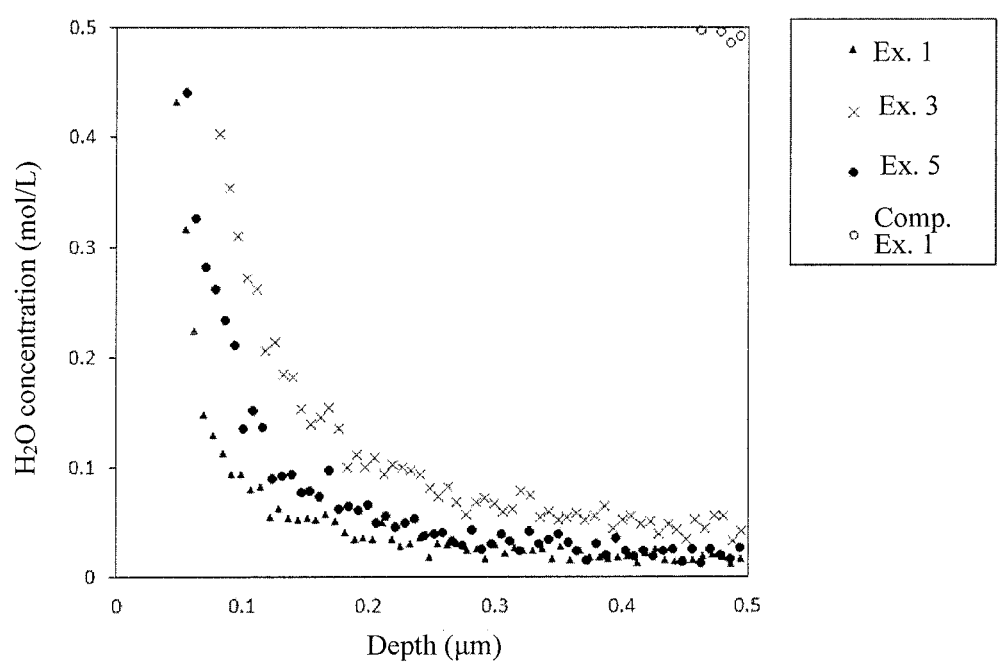
FIG. 3B shows the hydrogen concentration profiles of the chemically strengthened glasses obtained in Example 1, Example 3, Example 5 and Comparative Example 1.

As shown in FIG. 3A and FIG. 3B, no conspicuous difference in the intrusion depth of hydrogen could not be observed among glasses passing through the chemical strengthening step. The intrusion depth of hydrogen is highly likely to vary depending on the conditions of the chemical strengthening step. However, on the assumption that the intrusion depth of hydrogen does not vary, a negative correlation appears between each of $b_1$ and $b_2$ respectively corresponding to the hydrogen concentration in the outermost surface and a's corresponding to the inclinations prescribing the decreasing ratios of the hydrogen concentration. It is therefore preferable that $a_1$ and $a_2$ are approximately within the aforementioned ranges.

In this manner, the present invention pays attention to the hydrogen concentration in the surface layer and it has been found that in the case where the hydrogen concentration in the surface layer and the decreasing ratio thereof are prescribed within specific ranges, the strength of the chemically strengthened glass can be improved remarkably.

(Method for Measuring Hydrogen Concentration Profile)

Here, the hydrogen concentration profile ($H_2O$ concentration, mol/L) of glass is a profile measured under the following analysis conditions.

Secondary ion mass spectrometry (SIMS) was used for measuring the hydrogen concentration profile of a glass substrate. To obtain a quantitative hydrogen concentration profile by SIMS, a standard specimen having a known hydrogen concentration is required. A method for preparing the standard specimen and a method for quantitatively determining the hydrogen concentration thereof will be described below.

1) A part of a glass substrate to be measured is cut out.
2) A region at least 50 μm deep from a surface of the glass substrate cut out thus is removed by polishing or chemical etching. Removing treatment is performed on both surfaces. That is, the removed thickness is at least 100 μm in total on the both surfaces. The glass substrate subjected to the removing treatment is regarded as a standard specimen.
3) Infrared spectroscopy (IR) is applied to the standard specimen to obtain absorbance height $A_{3550}$ at a peak top near 3,550 cm$^{-1}$ and absorbance height $A_{4000}$ (base line) at 4,000 cm$^{-1}$ in an IR spectrum.
4) A sheet thickness d (cm) of the standard specimen is measured by using a sheet thickness meter such as a micrometer.
5) With reference to Literature A, the hydrogen concentration (mol/L, measured as $H_2O$) of the standard specimen is obtained by using Expression 1 on the assumption that the infrared practical absorbance index $\varepsilon_{pract}$(L/(mol·cm)) of $H_2O$ in the glass is 75.

Hydrogen concentration of standard specimen=
$(A_{3550}-A_{4000})/(\varepsilon_{pact} \cdot d)$   Expression 1

Literature A) S. Ilievski et al., Glastech. Ber. Glass Sci. Technol., 73 (2000) 39.

The glass substrate to be measured and the standard specimen with the known hydrogen concentration obtained by the aforementioned method are transferred into an SIMS apparatus simultaneously, and measured sequentially to obtain depth-direction profiles of $^1H^-$ and $^{30}Si^-$ intensities. After that, the $^1H^-$ profile is divided by the $^{30}Si^-$ profile to obtain a depth-direction profile of the $^1H^-/^{30}Si^-$ intensity ratio. From the depth-direction profile of the $^1H^-/^{30}Si^-$ intensity ratio in the standard specimen, an average $^1H^-/^{30}Si^-$ intensity ratio in a region of a depth of from 1 μm to 2 μm is calculated, and a calibration curve between the obtained value and the hydrogen concentration is created to pass through an origin (calibration curve on single standard specimen). By use of the calibration curve, the $^1H^-/^{30}Si^-$ intensity ratio in the ordinate of the profile of the glass substrate to be measured is converted into hydrogen concentration. Thus, a hydrogen concentration profile of the glass substrate to be measured is obtained. Incidentally, SIMS and IR measuring conditions will be described below.

(Measuring Conditions of SIMS)
Apparatus: ADEPT1010 made by ULVAC-PHI, Incorporated
Primary Ion Species: Cs$^+$
Primary Ion Acceleration Voltage: 5 kV
Primary Ion Current Value: 500 nA
Primary Ion Incident Angle: 60° with respect to normal line of specimen surface
Primary Ion Raster Size: 300×300 μm$^2$
Secondary Ion Polarity: minus
Secondary Ion Detection Region: 60×60 μm$^2$ (4% of primary ion raster size)
ESA Input Lens: 0
Use of Neutralization Gun: yes
Method for Converting Abscissa from Sputtering Time to Depth: Depth of an analysis crater is measured by a stylus type surface shape measuring instrument (Dektak 150 made by Veeco Instruments Inc.) to obtain a primary ion sputtering rate. By use of this sputtering rate, the abscissa is converted from the sputtering time to the depth.
Field Axis Potential upon $^1H^-$ detection: An optimum value may vary depending on the apparatus. A measurer sets the value carefully to cut the background sufficiently.
(Measuring Conditions of IR)
Apparatus: Nic-plan/Nicolet 6700 made by Thermo Fisher Scientific Inc., Resolution: 8 cm$^{-1}$, Integration: 64, Detector: TGS detector From the hydrogen concentration profile ($H_2O$ concentration, mol/L) of the glass measured under the aforementioned analysis conditions, Expression (I) is derived in the following procedure. Linear approximation is performed on the hydrogen concentration profile in the depth region of from 0.10 to 0.25 μm. An expression of the approximate straight line obtained thus is regarded as Expression (I).

Examples of means for controlling $a_1$ and $b_1$ include changing the concentration of flux, the concentration of sodium, the temperature, the time, etc. in the chemical strengthening step.

In the chemically strengthened glass according to the present invention, it is preferable that the average hydrogen concentration $c_1$ in the region of the near-surface (the depth X=0.10 to 0.25 μm from the outermost surface) is 0.050 to 0.180 mol/L. In the case where the average hydrogen concentration is within such a range, it is considered that the reliability of the surface strength is also improved, in addition to achieving a high surface strength. Incidentally, the average hydrogen concentration $c_1$ can be obtained from the aforementioned hydrogen concentration profile.

From the hydrogen concentration profile ($H_2O$ concentration, mol/L) of the glass measured under the aforementioned analysis conditions, Expression (II) is derived in the following procedure. Linear approximation is performed on the hydrogen concentration profile in the depth region of from 0.25 to 0.4 μm. An expression of the approximate straight line obtained thus is regarded as Expression (II).

Examples of means for controlling $a_2$ and $b_2$ include changing the concentration of flux, the concentration of sodium, the temperature, the time, etc. in the chemical strengthening step.

In the chemically strengthened glass according to the present invention, it is preferable that the average hydrogen concentration $c_2$ in the region of the depth X=0.25 to 0.4 μm from the outermost surface is 0.020 to 0.080 mol/L. In the case where the average hydrogen concentration is within such a range, it is considered that the reliability of the surface strength is also improved, in addition to achieving a high surface strength. Incidentally, the average hydrogen concentration $c_2$ can be obtained from the aforementioned hydrogen concentration profile.

The surface compressive stress value (CS) of the chemically strengthened glass according to the present invention is preferably 100 MPa or more, more preferably 200 MPa or more, and even more preferably 300 MPa or more. On the other hand, although the upper limit is not particularly limited, the surface compressive stress value is typically 1,200 MPa or less.

The compressive stress value can be measured by use of an EPMA (Electron Probe Micro Analyzer), a surface stress meter (e.g. FSM-6000 made by ORIHARA Industrial Co., Ltd.), or the like. The compressive stress value can be calculated by use of a stress profile calculation method disclosed in JP-A-2016-142600.

The internal tensile stress (CT) of the chemically strengthened glass according to the present invention is preferably 72 MPa or less, more preferably 62 MPa or less, and even more preferably 52 MPa or less. On the other hand, although the lower limit is not particularly limited, the internal tensile stress is typically 20 MPa or more. A stress distribution was measured, and the obtained stress distribution was integrated by thickness to obtain a CT value.

The chemically strengthened glass according to the present invention may be manufactured through a polishing step of polishing the glass surface before the chemical strengthening step. Here, polishing in the present invention means that the glass surface is ground with abrasive grains to be smoothed.

(Glass Strength)

The strength of the chemically strengthened glass according to the present invention can be evaluated by a ball-on-ring test.

(Ball-On-Ring Test)

The chemically strengthened glass according to the present invention is evaluated by BOR strength F (N) measured by a BOR (Ball On Ring) test performed as follows. That is, a glass sheet of the chemically strengthened glass is placed on a ring having a diameter of 30 mm. The ring is made of stainless steel with a contact portion rounded with a curvature radius of 2.5 mm. In a state where a ball made of steel and having a diameter of 10 mm is brought into contact with the glass sheet, the ball is loaded at the center of the ring under static load conditions.

The chemically strengthened glass according to the present invention preferably satisfies a relation of $F \geq 1200 \times t^2$ and more preferably satisfies a relation of $F \geq 1400 \times t^2$ [where F designates the BOR strength (N) measured by the ball-on-ring test, and t designates the sheet thickness (mm) of the glass substrate]. In the case where the BOR strength F (N) is within such a range, excellent strength can be shown even if the glass is made into a thin sheet.

Figure 2:
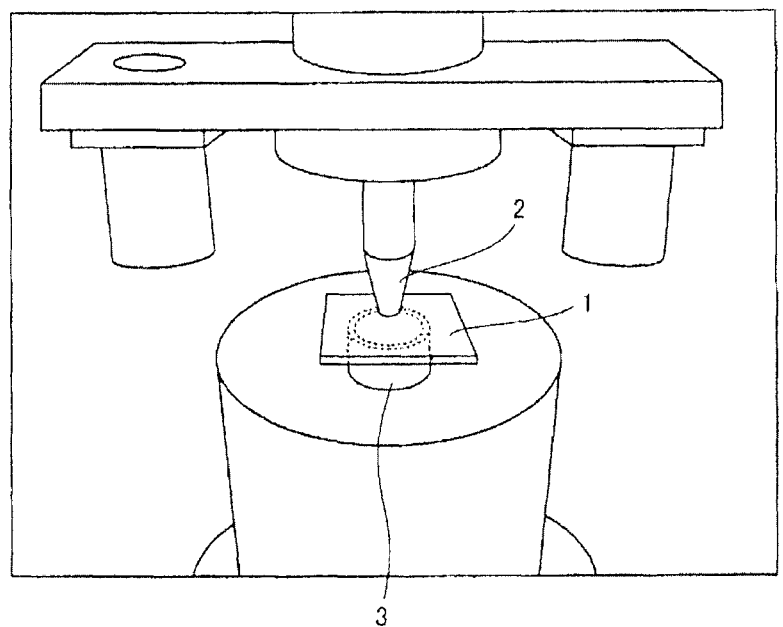
FIG. 2 is a schematic view for explaining a method of a ball-on-ring test.

FIG. 2 illustrates a schematic view for explaining the ball-on-ring test used in the present invention. In the ball-on-ring (BOR) test, in a state here a glass sheet 1 is mounted horizontally, the glass sheet 1 is pressurized by use of a pressure jig 2 (made of quenched steel, having a diameter of 10 mm, and mirror-finished) made of SUS304 to measure the strength of the glass sheet 1.

In FIG. 2, the glass sheet 1 which serves as a sample is placed horizontally on a reception jig 3 (having a diameter of 30 mm, including a contact portion having a curvature radius R of 2.5 mm and made of quenched steel, and mirror-finished) made of SUS304. The pressure jig 2 for pressurizing the glass sheet 1 is placed above the glass sheet 1. In this embodiment, a central region of the glass sheet 1 is pressurized from above the glass sheet 1.

In the present embodiment, the central region of the glass sheet 1 obtained after each of Examples and Comparative Examples is pressurized from above the glass sheet 1. Incidentally, testing conditions are described below.

Descending Rate of Pressure Jig 2: 1.0 (mm/min)

On this occasion, a breaking load (in units of N) at which the glass is broken is regarded as BOR strength, and an average value of 20 times measurements is regarded as surface strength F (N). Incidentally, the case where a breaking start point of the glass sheet is 2 mm or more away from the position where the ball is pressed is excluded from data for calculating the average value.

The chemically strengthened glass according to the present invention has not only a high surface strength as described above, but also high reliability of the surface strength. The chemically strengthened glass according to the present invention has a less dispersion in surface strength. Although the reason is not clear, it is supposed that the reason is that the hydrogen (moisture) concentration near the surface layer of the glass is slightly high.

In the chemically strengthened glass according to the present invention, it is preferable that the surface has no polishing flaw. Here, polishing in the present invention means that the glass surface is ground with abrasive grains to be smoothed. Presence or absence of polishing flaws can be determined by a surface observation with an AFM (Atomic Force Microscope). A case where two or more scratches having a length of 5 μm or more and a width of 0.1 μm or more are not present within a region measuring 10 μm by 5 μm can be regarded as the state where the surface has no polishing flaw.

<Method for Manufacturing Chemically Strengthened Glass>

A mode of a method for manufacturing a chemically strengthened glass according to the present invention (hereinafter also referred to as a method according to the present invention) will be described below. However, the present invention is not limited to the mode. Incidentally, unless specifically mentioned, the composition of the glass will be expressed in mole percentage on an oxide basis.

Examples of the method for manufacturing a chemically strengthened glass according to the present invention include a manufacturing method including a chemical strengthening step in which a glass is brought into contact with an inorganic salt containing at least one of sodium nitrate and potassium nitrate to thereby perform ion exchange, and an acid treatment step in which the glass after the aforementioned chemical strengthening step is brought into contact with an acidic solution having a pH value lower than 7, to thereby perform an acid treatment thereon. Each step will be described below.

(Chemical Strengthening Step)

The chemical strengthening step for obtaining a chemically strengthened glass according to the present invention is a step in which a glass is brought into contact with an inorganic salt whose hydrogen ion exponent (pH) is 7.5 or more and 10.5 or less in a form of a 10 mass % aqueous solution and which contains at least one of sodium nitrate and potassium nitrate, so that Na in the glass is ion-exchanged with K in the inorganic salt to form a compressive stress layer in a surface of the glass, and a surface layer of the compressive stress layer is modified into low density to form a low-density layer.

The hydrogen ion exponent (pH) of the inorganic salt is 7.5 or more, preferably 8.0 or more, and more preferably 8.5 or more, in a form of a 10 mass % aqueous solution. The hydrogen ion exponent (pH) of the inorganic salt is 10.5 or less, preferably 10.0 or less, and more preferably 9.5 or less, in the form of the 10 mass % aqueous solution.

In the case where the pH of the inorganic salt is set within the aforementioned range, Si—O—Si bond of the glass is cut suitably by OH⁻ in the inorganic salt so that the surface layer of the compressive stress layer can be modified to thereby form a low-density layer in the glass surface. The pH of the inorganic salt can be measured at 25° C. by use of a pH meter such as a handy type pH meter D-71S made by HORIBA, Ltd.

It is preferable that the inorganic salt contains at least one kind of salt selected from the group consisting of $KNO_2$, $NaNO_2$, $K_2CO_3$, $Na_2CO_3$, $KHCO_3$, $NaHCO_3$, KOH and NaOH. By the content of the aforementioned salt, the pH of the inorganic salt can be adjusted suitably.

The inorganic salt contains at least one of sodium nitrate and potassium nitrate. In the case where the inorganic salt contains at least one of sodium nitrate and potassium nitrate, the inorganic salt can be melted under the strain point of the glass, and can be handled easily in a typical temperature region where the chemical strengthening treatment is performed. In the case where sodium nitrate is contained in the inorganic salt, the chemically strengthened glass can be obtained with a large DOC with CTlimit or lower. Incidentally, the value of CTlimit is empirically known to be $-38.7 \times \ln(t)+48.2$ (MPa). Here, t designates the sheet thickness of the glass in units of mm.

The sodium nitrate content in the inorganic salt is preferably 1 mass % or more, and more preferably 5 mass % or more. Here, the sodium nitrate content in the inorganic salt is determined as the sodium concentration of the liquid-phase salt in which the inorganic salt is in a liquid state. Incidentally, the upper limit of the sodium nitrate content in the inorganic salt is not particularly limited.

In the case where the sodium nitrate content in the inorganic salt is 1 mass % or more, the inorganic salt can be melted under the strain point of the glass, and can be handled easily in the typical temperature region where the chemical strengthening treatment is performed. The sodium nitrate content in the inorganic salt is determined to be adjusted suitably so that a desired surface compressive stress value (CS in units of MPa) can be obtained.

In addition to sodium nitrate or potassium nitrate, the inorganic salt may contain other chemical species within a range which does not impede the effect of the present invention. Examples thereof include alkali chlorides such as sodium chloride and potassium chloride, alkali borates such as sodium borate and potassium borate, etc. One kind of these species may be added alone, or some kinds of them may be added in combination.

In the case where $KNO_2$ is contained in the aforementioned inorganic salt, the $KNO_2$ content in the inorganic salt is preferably 0.2 mass % or more, more preferably 0.4 mass % or more, and even more preferably 0.6 mass % or more. The $KNO_2$ content is preferably 10.0 mass % or less, more preferably 8.0 mass % or less, and even more preferably 6.0 mass % or less. In the case where the $KNO_2$ content is set within the aforementioned range, the pH of the inorganic salt in the form of the 10 mass % aqueous solution can be set to be 7.5 or more and 10.5 or less.

As a method for bringing the glass into contact with the inorganic salt, a method for applying the inorganic salt in paste form to the glass, a method for spraying an aqueous solution of the inorganic salt to the glass, a method for immersing the glass into a salt bath of the molten salt heated to at least the melting point of the inorganic salt, etc. can be used. Among them, the method for immersing the glass into the molten salt is preferred.

The glass used in the method according to the present invention is a glass containing sodium and phosphorus. Specifically, the glass has a composition containing, in mole percentage on an oxide basis, 55.5 to 76.5% of $SiO_2$, 5 to 20% of $Al_2O_3$, 8 to 25% of $Na_2O$ and 0.1% or more of $P_2O_5$. Incidentally, the glass may contain 1% or more of alkaline earth metal RO (RO designates MgO+CaO+SrO+BaO).

A method for manufacturing the glass is not particularly limited. The glass can be manufactured as follows. A desired glass raw material is put into a continuous melting furnace. The glass raw material is heated and melted preferably at 1,500 to 1,600° C., and clarified. After that, the molten glass is supplied to a forming apparatus and formed into a sheet-like shape. The sheet-like glass is gradually cooled and thus the glass can be obtained.

Incidentally, various methods can be used for forming the glass. Examples of the forming methods include a down draw process (such as an overflow down draw process, a slot down process, a redraw process), a float process, a roll-out process, a press process, etc.

The thickness of the glass is not particularly limited. However, in order to perform the chemical strengthening treatment effectively, the thickness is preferably 3 mm or less, more preferably 2 mm or less, and even more preferably 1 mm or less.

The shape of the glass used in the method according to the present invention is not particularly limited. For example, glasses having various shapes such as a flat sheet shape with a uniform sheet thickness, a shape with a curved surface in at least one of the front surface and the back surface, a cubic shape with a bent portion or the like, etc. can be used.

Specific examples of the composition of the glass used in the method according to the present invention include the following compositions of glasses.
(i) A glass containing, in mole percentage on an oxide basis, 55.5 to 76.5% of $SiO_2$, 12 to 20% of $Al_2O_3$, 8 to 25% of $Na_2O$ and 2.5% or more of $P_2O_5$.
(ii) A glass containing, in mole percentage on an oxide basis, 57 to 76.5% of $SiO_2$, 12 to 18% of $Al_2O_3$, 8 to 25% of $Na_2O$ and 2.5 to 10% of $P_2O_5$.
(iii) A glass containing, in mole percentage on an oxide basis, 56 to 72% of $SiO_2$, 5 to 18% of $Al_2O_3$, 0 to 15% of $B_2O_3$, 0.1 to 10% of $P_2O_5$, and 3 to 30% of a total content of $Na_2O$ and $K_2O$.

Furthermore, each of the glasses (i) to (iii) may contain 1% or more of alkaline earth metal RO (RO designates MgO+CaO+SrO+BaO).

The chemical strengthening treatment is performed as follows. That is, the glass is immersed into molten salt of the inorganic salt inside a molten salt bath so that metal ions (Na ions) in the glass are replaced by metal ions (K ions) in the molten salt, having larger ionic radii. Owing to this ion exchange, the composition in the glass surface can be altered to form a compressive stress layer 20 in which the glass surface has been made into higher density ((a) of FIG. 1 and (b) of FIG. 1). Owing to the higher density in the glass surface, compressive stress is generated so that the glass can be strengthened.

In the chemical strengthening step in the method according to the present invention, the chemical strengthening treatment for chemically strengthening the glass is performed using an inorganic salt having a hydrogen ion exponent (pH) of 7.5 or more and 10.5 or less in a form of a 10 mass % aqueous solution and containing at least one of sodium nitrate and potassium nitrate. Thus, Si—O—Si bond in the glass is cut suitably by $OH^-$ in the inorganic salt to thereby form a low-density layer 10 in which the surface layer of the compressive stress layer has been modified into lower density ((b) of FIG. 1 and (c) of FIG. 1).

Incidentally, in detail, the density of the chemically strengthened glass is gradually increased from an outer edge of an intermediate layer 30 (bulk) located at the center of the glass toward the surface of the compressive stress layer. Therefore, there is no clear boundary where the density varies suddenly between the intermediate layer 30 and the compressive stress layer 20. Here, the intermediate layer designates a layer which is located at a central portion of the glass and between compressive stress layers on both of the opposite sides. Differently from each compressive stress layer, the intermediate layer is a layer which has not been subjected to the ion exchange.

Specifically the chemical strengthening step can be performed as follows. In the chemical strengthening step, the glass is preheated, and the molten salt is adjusted to a treatment temperature for chemical strengthening. Next, the preheated glass is immersed into the molten salt for a predetermined time. The glass is lifted up from the molten salt, and cooled gradually. Incidentally, it is preferable that the glass is subjected to a profiling, for example, a mechanical processing such as cutting, end face processing, and perforating, in accordance with its usage before the chemical strengthening treatment.

The preheated temperature of the glass depends on the temperature at which the glass should be immersed into the molten salt. Generally, the temperature is preferably 100° C. or higher.

In order to obtain a chemically strengthened glass with a large DOC, the temperature at which the chemical strengthening is performed is preferably 400° C. or higher, more preferably 450° C. or higher, and even more preferably 470° C. or higher. The upper limit of the temperature at which the chemical strengthening is performed is not particularly limited, but typically the upper limit of the temperature is preferably not higher than the strain point (normally 500 to 600° C.) of the glass to be strengthened.

The time for which the glass is immersed in the molten salt depends on the chemical strengthening temperature. In order to obtain a chemically strengthened glass with a large DOC, the time for immersion is preferably 2 hours or more, more preferably 4 hours or more, and even more preferably 8 hours or more. The upper limit of the time for immersion is not particularly limited, but normally 48 hours or less and preferably 24 hours or less from the viewpoint of productivity.

The depth of the compressive stress layer (DOC) formed in the surface layer of the glass subjected to the chemical strengthening step is preferably 55 μm or more, more preferably 60 μm or more, and even more preferably 65 μm or more in order to provide sufficient strength to the glass. Incidentally, as described above, the depth of the compressive stress layer formed in the chemical strengthening step is approximately equal to the depth of the compressive stress layer after the acid treatment step or the alkali treatment step which will be described later. Accordingly, the depth of the compressive stress layer after the acid treatment step or after the acid treatment step and the alkali treatment step is also preferably 55 μm or more, more preferably 60 μm or more, and even more preferably 65 μm or more from the same viewpoint.

The compressive stress value of the chemically strengthened glass according to the present invention is preferably 100 MPa or more, more preferably 200 MPa or more, and even more preferably 300 MPa or more. Although the upper limit is not particularly limited, the compressive stress value is typically 1200 MPa or less.

The depth of the compressive stress layer can be measured by use of an EPMA (Electron Probe Micro Analyzer), a surface stress meter (e.g. FSM-6000 made by ORIHARA Industrial Co., Ltd.) or the like.

The low-density layer is removed in the acid treatment step which will be described later. Accordingly, as the low-density layer is thicker, the glass surface is removed more easily. Therefore, from the viewpoint of the amount of the glass surface to be removed, the thickness of the low-density layer is preferably 10 nm or more, and more preferably 20 nm or more. The thickness of the low-density layer can be controlled by the sodium concentration in the molten salt, the temperature, the time, etc. in the chemical strengthening step.

In the case where the alkali treatment is performed after the low-density layer is removed in the acid treatment step, the low-density layer can be further removed.

From the viewpoint of removability of the glass surface, the density of the low-density layer is preferably lower than the density of the region (bulk) deeper than the compressive stress layer subjected to the ion exchange.

The thickness of the low-density layer can be obtained from a cycle ($\Delta\theta$) measured by X-ray-Reflectometry (XRR). The density of the low-density layer can be obtained from a critical angle ($\theta c$) measured by the XRR. Incidentally, in a simple manner, the formation of the low-density layer and the thickness of the layer can be confirmed by observing a section of the glass with a scanning electron microscope (SEM).

In the chemical strengthening step, in combination with the aforementioned chemical strengthening treatment which is performed with an inorganic salt having a hydrogen ion exponent (pH) of 7.5 or more and 10.5 or less in a form of a 10 mass % aqueous solution and containing at least one of sodium nitrate and potassium nitrate, another chemical strengthening step in which at least one condition of the conditions about the composition of the inorganic salt, the hydrogen ion exponent, the chemical strengthening temperature and the chemical strengthening time is changed from that of the aforementioned chemical strengthening treatment may be performed a plurality of times before and after the aforementioned chemical strengthening step.

After the chemical strengthening step, the glass is washed with industrial water, ion exchanged water, or the like. Particularly the ion exchanged water is preferred. The conditions of the washing vary depending on the washing solution to be used. When the ion exchanged water is used, the washing is preferably performed at 0 to 100° C. in order to perfectly remove the salt adhering to the glass.

(Acid Treatment Step)

In the acid treatment step, the glass washed after the chemical strengthening step is further subjected to an acid treatment. The acid treatment for the glass is performed by bringing the glass into contact with an acidic solution whose hydrogen ion exponent (pH) is lower than 7.0.

The solution used for the acid treatment is not particularly limited as long as it is acidic. As long as the pH is lower than 7.0, acid used as the solution may be either weak acid or strong acid. Specifically preferred examples of the solution include acids such as hydrochloric acid, nitric acid, sulfuric acid, phosphoric acid, acetic acid, oxalic acid, carbonic acid, and citric acid. One of those acids may be used alone, or a plurality of them may be used in combination.

The temperature for performing the acid treatment varies depending on the kind or concentration of acid to be used, and the time of the treatment. It is preferable to perform the acid treatment at 100° C. or lower. In order to make it easy to remove the low-density layer, it is preferable to perform the acid treatment at 20° C. or higher. The time for which the acid treatment is performed also varies depending on the kind or concentration of acid to be used, and the temperature of the treatment. In terms of the productivity, the time for acid treatment is preferably 10 seconds to 5 hours, and more preferably 1 minute to 2 hours.

The concentration of the solution for performing the acid treatment varies depending on the kind of acid to be used, and the time and the temperature of the treatment. A concentration with less concern about corrosion of a container is preferable. Specifically, the concentration of the solution is preferably 0.1 mass % to 20 mass %.

As a specific example of the conditions of the acid treatment, it is preferable that the glass subjected to the chemical strengthening step is brought into contact with 0.1 mass % to 10 mass % of a nitric acid aqueous solution at 35 to 75° C. and for 1 to 15 minutes.

By the aforementioned acid treatment, the lowering of the density in the glass surface is accelerated, and a surface layer from which a part or all of the low-density layer has been removed is exposed ((c) of FIG. 1 and (d) of FIG. 1). Thus, a chemically strengthened glass having a conspicuously improved surface strength can be obtained. Furthermore, since the low-density layer is removed, flaws which had been present in the glass surface are removed concurrently. It is considered that this point also contributes to improvement of the strength.

(Alkali Treatment Step)

Successively, an alkali treatment may be performed after the acid treatment. In the case where the alkali treatment is performed, the removal amount of the low-density layer can be increased to further enhance the surface strength in comparison with the case where only the acid treatment is performed.

The solution used for the alkali treatment is not particularly limited as long as it is basic. As long as the pH exceeds 7.0, either weak base or strong base may be used. Specifically, preferred examples of the solution include bases such as sodium hydroxide, potassium hydroxide, potassium carbonate, and sodium carbonate. One of those bases may be used alone, or a plurality of them may be used in combination.

The temperature for performing the alkali treatment varies depending on the kind or concentration of base to be used, and the time of the treatment. The alkali treatment may be performed preferably at 0 to 100° C., more preferably 10 to 80° C., and particularly preferably 20 to 60° C. It is preferable that the temperature is within such a range because there is no concern that the glass is corroded.

The time for which the alkali treatment is performed varies depending on the kind or concentration of base to be used, and the temperature of the treatment. In terms of the productivity, the time for the alkali treatment is preferably 10 seconds to 5 hours, and more preferably 1 minute to 2 hours. The concentration of the solution for performing the alkali treatment varies depending on the kind of base to be used, the time and the temperature of the treatment. From the viewpoint of the removability of the glass surface, the concentration of the solution is preferably 0.1 mass % to 20 mass %.

As a specific example of the conditions of the alkali treatment, it is preferable that the glass subjected to the acid treatment step is brought into contact with 0.1 mass % to 10 mass % of a sodium hydroxide aqueous solution at 35 to 75° C. and for 1 to 15 minutes.

By the aforementioned alkali treatment, a surface layer from which the low-density layer has been further removed is exposed in comparison with the glass subjected to the acid treatment step. Thus, a chemically strengthened glass having a further improved surface strength can be obtained. Furthermore, flaws which had been present in the glass surface are also further removed. It is considered that this point also contributes to improvement of the surface strength.

Incidentally, it is preferable that a washing step similar to the washing step after the chemical strengthening step is provided between the acid treatment step and the alkali treatment step or after the completion of the alkali treatment step.

Incidentally, the amount of the low-density layer to be removed depends on the conditions for the acid treatment step or the conditions for at least one of the acid treatment step and the alkali treatment step. (d) of FIG. 1 illustrates a state that all the low-density layer 10 is removed. However, a part of the low-density layer 10 may be removed while the other part remains. From the viewpoint of improvement of strength, it is possible to obtain an effect even in the case where all the low-density layer is not removed.

EXAMPLES

Examples and Comparative Examples will be illustrated below for explaining the present invention specifically. However, the present invention is not limited to those Examples. Incidentally, presence (YES) or absence (NO) of each step in each of Examples and Comparative Examples is shown in Table 1.

Example 1

(Chemical Strengthening Treatment Step)

Potassium nitrate, potassium nitrite and sodium nitrate were put into a cup made of SUS as a molten salt bath, and heated to 450° C. by a mantle heater. Thus, molten salt of inorganic salt containing 0.93 weight % of potassium nitrite and 55 weight % of sodium nitrate as components other than potassium nitrate and having a pH of 9.4 was prepared. Aluminosilicate glass A measuring 50 mm by 50 mm and having a sheet thickness of 0.80 mm was prepared, and preheated to 200 to 400° C. After that, the preheated glass was immersed into the molten salt at 450° C. and for 14 hours so as to be subjected to ion exchange. Subsequently, the glass was immersed into molten salt, heated to 400° C., of inorganic salt containing 0.37 weight % of sodium nitrate and having a pH of 6.1, for 15 minutes, so as to be subjected to a chemical strengthening treatment. The chemically strengthened glass obtained thus was washed with water, and provided for the next step. Incidentally, the composition of the inorganic salt contained $KNO_3$ other than the composition shown in Table 1, so as to have 100 mass % in total. The pH of the inorganic salt was a value measured at 25° C. by use of a handy type pH meter D-71S made by HORIBA, Ltd., in a form of a 10 mass % aqueous solution of the inorganic salt.

Composition of Aluminosilicate Glass A (in mole percentage on an oxide basis): 56.1% of $SiO_2$, 17.2% of $Al_2O_3$, 16.8% of $Na_2O$, 6.8% of $P_2O_5$, and 2.5% or more of alkaline earth metal RO (RO designates MgO+CaO+SrO+BaO).

(Acid Treatment Step)

A 6 mass % of nitric acid aqueous solution was prepared in a beaker, and the temperature thereof was adjusted to 40° C. by use of a water bath. The glass obtained in the aforementioned chemical strengthening treatment step was immersed into the adjusted nitric acid aqueous solution for 120 seconds so as to be subjected to acid treatment. After that, the glass was washed with pure water several times, and then dried by air blowing. The glass obtained thus was provided for the next step.

Example 2

A chemically strengthened glass in Example 2 was obtained in the same manner as in Example 1, except that the following alkali treatment was performed after the acid treatment step.

(Alkali Treatment Step)

A 4.0 weight % of sodium hydroxide aqueous solution was prepared in a beaker, and the temperature thereof was adjusted to 40° C. by use of a water bath. The glass obtained in the acid treatment step was immersed into the adjusted sodium hydroxide aqueous solution for 120 seconds so as to be subjected to alkali treatment. After that, the glass was washed with pure water several times, and then dried by air blowing.

Example 3

A chemically strengthened glass in Example 3 was obtained in the same manner as in Example 1, except that the chemical strengthening treatment step was performed in the following step.

(Chemical Strengthening Treatment Step)

Potassium nitrate and sodium nitrate were put into a cup made of SUS as a molten salt bath, and heated to 450° C. by a mantle heater. Thus, molten salt of inorganic salt containing 0.56 weight % of potassium nitrite and 55 weight % of sodium nitrate as components other than potassium nitrate and having a pH of 8.6 was prepared. Aluminosilicate glass A measuring 50 mm by 50 mm and having a sheet thickness of 0.80 mm was prepared, and preheated to 200 to 400° C. After that, the preheated glass was immersed into the molten salt at 450° C. and for 14 hours so as to be subjected to ion exchange.

Example 4

A chemically strengthened glass in Example 4 was obtained in the same manner as in Example 3, except that the alkali treatment step was performed after the acid treatment step in the same manner as in Example 2.

Example 5

A chemically strengthened glass in Example 5 was obtained in the same manner as in Example 1, except that the chemical strengthening treatment step was performed in the following step.

(Chemical Strengthening Treatment Step)

Potassium nitrate and sodium nitrate were put into a cup made of SUS as a molten salt bath, and heated to 500° C. by a mantle heater. Thus, molten salt of inorganic salt containing 0.93 weight % of potassium nitrite and 55 weight % of sodium nitrate as components other than potassium nitrate and having a pH of 9.2 was prepared. Aluminosilicate glass A measuring 50 mm by 50 mm and having a sheet thickness of 0.80 mm was prepared, and preheated to 200 to 400° C. After that, the preheated glass was immersed into the molten salt at 450° C. and for 5 hours so as to be subjected to ion exchange. Subsequently, the glass was immersed into molten salt, heated to 400° C., of inorganic salt containing 0.74 weight % of sodium nitrate and having a pH of 6.1, for 15 minutes so as to be subjected to a chemical strengthening treatment.

Example 6

A chemically strengthened glass in Example 6 was obtained in the same manner as in Example 5, except that the alkali treatment step was performed after the acid treatment step in the same manner as in Example 2.

Comparative Example 1

A chemically strengthened glass in Comparative Example 1 was obtained in the same manner as in Example 1, except that the acid treatment step was not performed.

Comparative Example 2

A chemically strengthened glass in Comparative Example 2 was obtained in the same manner as in Example 3, except that the molten salt of inorganic salt containing 0.93 weight % of potassium nitrite and 55 weight % of sodium nitrate as components other than potassium nitrate and having a pH of 9.4 was used, and the acid treatment step was not performed.

Comparative Example 3

A chemically strengthened glass in Comparative Example 3 was obtained in the same manner as in Example 3, except that the chemical strengthening treatment step was performed in the following step.
(Chemical Strengthening Treatment Step)
Potassium nitrate and sodium nitrate were put into a cup made of SUS as a molten salt bath, and heated to 450° C. by a mantle heater. Thus, molten salt of inorganic salt containing 0.04 weight % of potassium nitrite and 0.74 weight % of sodium nitrate as components other than potassium nitrate and having a pH of 6.7 was prepared. Aluminosilicate glass A measuring 50 mm by 50 mm and having a sheet thickness of 0.80 mm was prepared, and preheated to 200 to 400° C. After that, the preheated glass was immersed into the molten salt at 450° C. and for 2 hours so as to be subjected to ion exchange.

Comparative Example 4

A chemically strengthened glass in Comparative Example 4 was obtained in the same manner as in Example 5, except that the acid treatment step was not performed.

Comparative Example 5

A chemically strengthened glass in Comparative Example 5 was obtained in the same manner as in Example 1, except that the acid treatment step was not performed, and the following polishing step was performed.
(Polishing Step)
Slurry in which cerium oxide having an average particle diameter (d50) of 1 µm was dispersed in water was prepared as polishing slurry. By use of the obtained slurry, both of the opposite surfaces of a flat glass sheet were polished by about 6 µm deep in total with a nonwoven polishing pad having a hardness (Shore A hardness) of 74 and on the condition of a pressure of 0.1 kPa.

Various evaluations were performed on the obtained chemically strengthened glasses. Results are shown in Table 1. Each blank field in Table 1 designates that the evaluation was not performed. FIG. 3A and FIG. 3B show hydrogen concentration profiles of the chemically strengthened glasses obtained in Example 1, Example 3 and Example 5 and the glass obtained in Comparative Example 1.
<Evaluation Method>
The various evaluations in Examples and Comparative Examples were performed by the following analysis methods.
(Surface Removal Amount)
The thickness of the removal amount of the glass was obtained by measuring weights before and after the chemical treatment (acid treatment and alkali treatment) by an analytical electronic balance (HR-202i, made by A&D Company, Limited) and converting the weights into thickness by means of the following expression.

(thickness of removal amount per a side)=[(weight before treatment)−(weight after treatment)]/ (glass specific gravity)/treated area/2

On this occasion, the glass specific gravity of the glass material (glass A) was a value shown below, and the value was used for the calculation.
Glass A: 2.42 (g/cm$^3$)
(Surface Compressive Stress and Depth of Compressive Stress Layer)
The surface compressive stress value (CS) and the depth of the compressive stress layer (DOC in the units of µm) were measured by use of a surface stress meter (FSM-6000) made by ORIHARA Industrial Co., Ltd. The compressive stress value (CS) and the depth of the compressive stress layer (DOC) were calculated by use of a stress profile calculation method disclosed in Japanese Patent Publication No. 2016-142600.
(Surface Roughness)
The surface roughness in a measurement region measuring 1 µm by 0.5 µm was measured by surface observation on the following conditions using an AFM.
(Measuring Conditions of AFM)
Apparatus: Nanoscope V+MultiMode 8 or Dimension ICON, made by Bruker Corporation
Mode; ScanAsyst mode
Probe: RTESPA (spring constant: 40 N/m)
Samples/Line: 256
Lines: 128
Scan Rate: 1 Hz
Measuring Field: 1×0.5 µm$^2$ (aiming at a place free from contamination)
(Polishing Flaws)
Presence or absence of polishing flaws was determined by surface observation with an AFM (Atomic Force Microscope). A case where two or more scratches having a length of 5 µm or more and a width of 0.1 µm or more were not present within a region measuring 10 µm by 5 µm was evaluated as the state where the surface has "NO" polishing flaw.
(Surface Strength)
The glass surface strength was measured by a ball-on-ring (BOR) test. FIG. 2 illustrates a schematic view for explaining the ball-on-ring test used in the present invention. A glass sheet 1 (aluminosilicate glass A in the Examples) which has been mounted horizontally was pressurized by use of a pressure jig 2 (made of quenched steel, having a diameter of 10 mm, and mirror-finished) made of SUS304 to measure the strength of the glass sheet 1.

In FIG. 2, the glass sheet 1 which serves as a sample is placed horizontally on a reception jig 3 (having a diameter of 30 mm, including a contact portion having a curvature radius R of 2.5 mm and made of quenched steel, and mirror-finished) made of SUS304. The pressure jig 2 for pressurizing the glass sheet 1 is placed above the glass sheet 1.

The central region of the glass sheet 1 obtained from each of Examples and Comparative Examples was pressurized from above the glass sheet 1. Incidentally, testing conditions is described below.
Descending Rate of Pressure Jig 2: 1.0 (mm/min)

On this occasion, a breaking load (in units of N) at which the glass was broken was regarded as BOR strength, and an average value of BOR strength measured 20 times was regarded as surface strength F (N). In the case where a breaking start point of the glass sheet was 2 mm or more away from the position where the ball (pressure jig) was pressed, the measured BOR strength was excluded from data for calculating the average value.

The surface strength F (N) depends on the sheet thickness t (mm) of the glass sheet. Therefore, here, the surface strength F (N) was standardized (normalized) with the sheet thickness t (mm) of the glass sheet for comparison. The value standardized (normalized) with the sheet thickness t (mm) of the glass sheet was set as a (in units of $N/mm^2$). The value a was calculated by the expression: $a=F/t^2$.

(Tensile Stress)

The tensile stress value (CT in units of MPa) was calculated by measuring a stress distribution according to the stress profile calculation method disclosed in Japanese Patent Publication No. 2016-142600, and integrating the obtained stress distribution by thickness.

(Hydrogen Concentration)

According to the method described in the aforementioned (Method for Measuring Hydrogen Concentration Profile), a hydrogen concentration profile was measured, and the Expressions (I) and (II) and the average hydrogen concentrations (values $c_1$ and $c_2$) were derived therefrom.

TABLE 1

| | | | unit | Ex. 1 | Ex. 2 | Ex. 3 |
|---|---|---|---|---|---|---|
| glass material | | kind | | glass A | glass A | glass A |
| | | sheet thickness | mm | 0.80 | 0.80 | 0.80 |
| chemical strengthening step | first strengthening | $K_2CO_3$ | weight % | — | — | — |
| | | $KNO_2$ | weight % | 0.93 | 0.93 | 0.56 |
| | | $NaNO_3$ | weight % | 55 | 55 | 55 |
| | | pH | | 9.4 | 9.4 | 8.6 |
| | | temperature | °C. | 450 | 450 | 450 |
| | | time | hr | 14 | 14 | 14 |
| | second strengthening | $K_2CO_3$ | weight % | — | — | — |
| | | $KNO_2$ | weight % | — | — | — |
| | | $NaNO_3$ | weight % | 0.37 | 0.37 | — |
| | | pH | | 6.1 | 6.1 | — |
| | | temperature | °C. | 400 | 400 | — |
| | | time | hr | 0.25 | 0.25 | — |
| | acid treatment step | | | YES | YES | YES |
| | alkali treatment step | | | NO | YES | NO |
| | polishing step | | | NO | NO | NO |
| | surface removal amount | | nm/side | 1046 | 1092 | 622 |
| | surface roughness (Ra) | | nm | 0.63 | 0.58 | 0.83 |
| surface hydrogen concentration profile Y1 | X1 = 0.10 to 0.25 (μm) | a1 value | | −0.524 | | −1.604 |
| | | b1 value | | 0.149 | | 0.446 |
| | | c1 value | mol/L | 0.060 | | 0.175 |
| surface hydrogen concentration profile Y2 | X2 = 0.25 to 0.4 (μm) | a2 value | | −0.088 | | −0.192 |
| | | b2 value | | 0.056 | | 0.131 |
| | | c2 value | mol/L | 0.028 | | 0.070 |
| | surface strength | F | N | 909 | 943 | 803 |
| | | a: $F/t^2$ | | 1418 | 1495 | 1280 |
| | | CS | MPa | 751 | 770 | 245 |
| | | DOC | μm | 85 | 82 | 86 |
| | | CT | MPa | 42 | 40 | 32 |
| | | polishing flaws | | NO | NO | NO |

| | | | unit | Ex. 4 | Ex. 5 | Ex. 6 |
|---|---|---|---|---|---|---|
| glass material | | kind | | glass A | glass A | glass A |
| | | sheet thickness | mm | 0.80 | 0.80 | 0.80 |
| chemical strengthening step | first strengthening | $K_2CO_3$ | weight % | — | — | — |
| | | $KNO_2$ | weight % | 0.56 | 0.93 | 0.93 |
| | | $NaNO_3$ | weight % | 55 | 55 | 55 |
| | | pH | | 8.6 | 9.2 | 9.2 |
| | | temperature | °C. | 450 | 500 | 500 |
| | | time | hr | 14 | 5 | 5 |
| | second strengthening | $K_2CO_3$ | weight % | — | — | — |
| | | $KNO_2$ | weight % | — | — | — |
| | | $NaNO_3$ | weight % | — | 0.74 | 0.74 |
| | | pH | | — | 6.1 | 6.1 |
| | | temperature | °C. | — | 400 | 400 |
| | | time | hr | — | 0.25 | 0.25 |
| | acid treatment step | | | YES | YES | YES |
| | alkali treatment step | | | YES | NO | YES |
| | polishing step | | | NO | NO | NO |
| | surface removal amount | | nm/side | 661 | 1060 | 1096 |
| | surface roughness (Ra) | | nm | 0.62 | 1.25 | 0.73 |
| surface hydrogen concentration profile Y1 | X1 = 0.10 to 0.25 (μm) | a1 value | | | −0.769 | |
| | | b1 value | | | 0.219 | |
| | | c1 value | mol/L | | 0.087 | |
| surface hydrogen concentration profile Y2 | X2 = 0.25 to 0.4 (μm) | a2 value | | | −0.114 | |
| | | b2 value | | | 0.072 | |
| | | c2 value | mol/L | | 0.036 | |

TABLE 1-continued

|  |  |  |  |  |  |  |
|---|---|---|---|---|---|---|
| surface strength | F | N | 990 | 923 | 784 |
|  | a: F/t^2 |  | 1576 | 1471 | 1243 |
|  | CS | MPa | 245 | 737 | 745 |
|  | DOC | μm | 86 | 80 | 83 |
|  | CT | MPa | 32 | 35 | 36 |
|  | polishing flaws |  | NO | NO | NO |

|  |  |  |  | Comp. Ex. 1 | Comp. Ex. 2 | Comp. Ex. 3 |
|---|---|---|---|---|---|---|
| glass material |  | kind | unit | glass A | glass A | glass A |
|  |  | sheet thickness | mm | 0.80 | 0.80 | 0.80 |
| chemical strengthening step | first strengthening | $K_2CO_3$ | weight % | — | — | — |
|  |  | $KNO_2$ | weight % | 0.93 | 0.93 | 0.04 |
|  |  | $NaNO_3$ | weight % | 55 | 55 | 0.74 |
|  |  | pH |  | 9.4 | 9.4 | 6.7 |
|  |  | temperature | °C. | 450 | 450 | 450 |
|  |  | time | hr | 14 | 14 | 2 |
|  | second strengthening | $K_2CO_3$ | weight % | — | — | — |
|  |  | $KNO_2$ | weight % | — | — | — |
|  |  | $NaNO_3$ | weight % | 0.37 | — | — |
|  |  | pH |  | 6.1 | — | — |
|  |  | temperature | °C. | 400 | — | — |
|  |  | time | hr | 0.25 | — | — |
|  | acid treatment step |  |  | NO | NO | YES |
|  | alkali treatment step |  |  | NO | NO | NO |
|  | polishing step |  |  | NO | NO | NO |
|  | surface removal amount |  | nm/side | — | — | 90 |
|  | surface roughness (Ra) |  | nm | 0.20 | 0.19 | 0.75 |
| surface hydrogen concentration profile Y1 | X1 = 0.10 to 0.25 (μm) | a1 value |  | −14.075 |  |  |
|  |  | b1 value |  | 4.036 |  |  |
|  |  | c1 value | mol/L | 1.628 |  |  |
| surface hydrogen concentration profile Y2 | X2 = 0.25 to 0.4 (μm) | a2 value |  | −1.838 |  |  |
|  |  | b2 value |  | 1.282 |  |  |
|  |  | c2 value | mol/L | 0.692 |  |  |
| surface strength | F | N | 172 | 187 | 485 |
|  | a: F/t^2 |  | 266 | 295 | 766 |
|  | CS | MPa | 782 | 245 | 698 |
|  | DOC | μm | 81 | 89 | 52 |
|  | CT | MPa | 40 | 33 | 48 |
|  | polishing flaws |  | NO | NO | NO |

|  |  |  |  | Comp. Ex. 4 | Comp. Ex. 5 |
|---|---|---|---|---|---|
| glass material |  | kind | unit | glass A | glass A |
|  |  | sheet thickness | mm | 0.80 | 0.80 |
| chemical strengthening step | first strengthening | $K_2CO_3$ | weight % | — | — |
|  |  | $KNO_2$ | weight % | 0.93 | 0.93 |
|  |  | $NaNO_3$ | weight % | 55 | 55 |
|  |  | pH |  | 9.2 | 9.4 |
|  |  | temperature | °C. | 500 | 450 |
|  |  | time | hr | 5 | 14 |
|  | second strengthening | $K_2CO_3$ | weight % | — | — |
|  |  | $KNO_2$ | weight % | — | — |
|  |  | $NaNO_3$ | weight % | 0.74 | 0.74 |
|  |  | pH |  | 6.1 | 6.1 |
|  |  | temperature | °C. | 400 | 400 |
|  |  | time | hr | 0.25 | 0.25 |
|  | acid treatment step |  |  | NO | NO |
|  | alkali treatment step |  |  | NO | NO |
|  | polishing step |  |  | NO | YES |
|  | surface removal amount |  | nm/side | — | 3400 |
|  | surface roughness (Ra) |  | nm | 0.22 | 0.66 |
| surface hydrogen concentration profile Y1 | X1 = 0.10 to 0.25 (μm) | a1 value |  |  |  |
|  |  | b1 value |  |  |  |
|  |  | c1 value | mol/L |  |  |
| surface hydrogen concentration profile Y2 | X2 = 0.25 to 0.4 (μm) | a2 value |  |  |  |
|  |  | b2 value |  |  |  |
|  |  | c2 value | mol/L |  |  |

TABLE 1-continued

| surface strength | F | N | 159 | 511 |
|---|---|---|---|---|
| | a: F/t^2 | | 251 | 817 |
| CS | | MPa | 749 | 635 |
| DOC | | μm | 90 | 81 |
| CT | | MPa | 40 | 34 |
| polishing flaws | | | NO | YES |

As shown in Table 1, it was confirmed that each of the chemically strengthened glasses in Examples 1 to 6 which were chemically strengthened glasses according to the present invention had a large depth of a compressive stress layer (DOC) and an excellent surface strength even after being chemically strengthened at a high temperature for a long time, in comparison with the chemically strengthened glasses obtained in Comparative Examples 1 to 5.

Furthermore, in each of the chemically strengthened glasses obtained in Examples 1, 3 and 5 which had a surface roughness (Ra) of 0.50 nm or more and had a compressive stress layer with a depth of 55 μm or more, and in which the hydrogen concentrations $c_1$ and $c_2$ in the surface layer of the glass were within specific ranges, the removal amount of the modified layer in the surface could be increased so that the surface strength could be improved conspicuously, in comparison with the chemically strengthened glasses obtained in Comparative Examples 1 to 5.

Although the present invention has been described in detail with reference to its specific embodiments, it is obvious for those in the art that various changes and modifications can be made without departing from the spirit and scope of the present invention. The present application is based on a Japanese Patent Application (Japanese Patent Application No. 2017-087404) filed on Apr. 26, 2017, the entire contents of which are incorporated by citation. In addition, all the references cited herein are incorporated entirely.

REFERENCE SIGNS LIST

10 low-density layer
20 compressive stress layer
30 intermediate layer
1 glass sheet
2 pressure jig
3 reception jig

The invention claimed is:

1. A chemically strengthened glass comprising a compressive stress layer that is formed in a surface layer of the glass by an ion exchange method, wherein:
   the glass has a surface roughness (Ra) of 0.50 nm or more;
   the glass has a depth of the compressive stress layer of 55 μm or more;
   the glass has a composition comprising, in mole percentage on an oxide basis, 55.5 to 76.5% of $SiO_2$, 5 to 20% of $Al_2O_3$, 8 to 25% of $Na_2O$ and 0.1% or more of $P_2O_5$;
   a hydrogen concentration Y1 in a region of a depth X from an outermost surface of the chemically strengthened glass satisfies Expression (I) below at X1=0.10 to 0.25 (μm);
   a hydrogen concentration Y2 in a region of the depth X from the outermost surface of the chemically strengthened glass satisfies Expression (II) below at X2=0.25 to 0.4 (μm); and
   a surface strength F (N) measured on the conditions below by a ball-on-ring test satisfies a relation of $F \geq 1200 \times t^2$ with respect to a sheet thickness t (mm) of a sheet of the glass:

$$Y1 = a_1 X1 + b_1 \quad (I),$$

wherein:
   Y1 is the hydrogen concentration (mol/L, measured as $H_2O$);
   X1 is the depth from the outermost surface of the glass (μm);
   $a_1$ is −1.700 to −0.500; and
   $b_1$ is 0.100 to 0.460, $$Y2 = a_2 X2 + b_2 \quad (II),$$

wherein:
   Y2 is the hydrogen concentration (mol/L, measured as $H_2O$);
   X2 is the depth from the outermost surface of the glass (μm);
   $a_2$ is −0.200 to −0.010; and
   $b_2$ is 0.050 to 0.150, ball-on-ring test conditions:
A glass sheet having a sheet thickness t (mm) is disposed on a stainless steel ring having a diameter of 30 mm and including a contact portion rounded with a curvature radius of 2.5 mm, and a steel ball having a diameter of 10 mm is brought into contact with the glass sheet; In this state, the ball is loaded at a center of the ring under a static load conditions; A breaking load (in units of N) at which the glass is broken is regarded as a BOR strength, and an average value of 20 times measurements of the BOR strength is regarded as the surface strength F; Here, the case where a breaking start point of the glass is 2 mm or more away from a loading point of the ball is excluded from data for calculating the average value.

2. The chemically strengthened glass according to claim 1,
   having an average hydrogen concentration $c_1$ of 0.050 to 0.180 mol/L, in a region of the depth X1=0.10 to 0.25 μm from the outermost surface of the chemically strengthened glass, and
   having an average hydrogen concentration $c_2$ of 0.020 to 0.080 mol/L, in a region of the depth X2=0.25 to 0.4 μm.

3. The chemically strengthened glass according to claim 1, having no polishing flaws in the surface thereof.

4. The chemically strengthened glass according to claim 1, comprising 1% or more of an alkaline earth metal RO, wherein RO designates MgO+CaO+SrO+BaO.

5. The chemically strengthened glass according to claim 1, having a surface compressive stress of 100 MPa or more.

6. The chemically strengthened glass according to claim 1, having an internal tensile stress of 72 MPa or less.

* * * * *